United States Patent

Bryant et al.

[15] 3,685,025

[45] Aug. 15, 1972

[54] SENSE AMPLIFIER/BIT DRIVER FOR SEMICONDUCTOR MEMORIES

[72] Inventors: Richard W. Bryant, 131 Rochdale Road, Poughkeepsie, N.Y. 12603; George K. Tu, 2 Dana Place, Wappingers Falls, N.Y. 12590

[22] Filed: June 25, 1970

[21] Appl. No.: 49,631

[52] U.S. Cl. ............................340/173 FF, 307/238

[51] Int. Cl. ..............................................G11c 7/00

[58] Field of Search........340/173, 347 DD; 307/238; 330/69

[56] References Cited

UNITED STATES PATENTS

| | | | |
|---|---|---|---|
| 3,541,531 | 11/1970 | Iwersen et al. | 340/173 |
| 3,528,065 | 9/1970 | Christensen | 307/238 X |
| 3,440,444 | 4/1969 | Rapp | 340/173 |
| 3,540,005 | 11/1970 | Bernhardt et al. | 340/173 |
| 3,529,294 | 9/1970 | Zuk | 340/173 |

*Primary Examiner*—Maynard R. Wilbur
*Assistant Examiner*—Charles D. Miller
*Attorney*—Harry M. Weiss

[57] ABSTRACT

A combined, differentially operated sense amplifier and bit driver circuit for a semiconductor memory system which requires only a single decoder. The state of a selected cell is sensed depending upon the relative polarities of the signals on a pair of sense/drive conductors extended to a group of cells. A bit is written in a selected cell by energizing a selected one of the same two conductors. The same polarity decoder output signal causes the sense amplifier/bit driver circuit to operate in either the read or write mode depending upon the state of a read/write conductor extended to the circuit.

13 Claims, 4 Drawing Figures

INVENTORS
RICHARD W. BRYANT
GEORGE K. TU
Amster & Rothstein
BY Harry M Weiss
ATTORNEYS

SENSE AMPLIFIER/BIT DRIVER FOR SEMICONDUCTOR MEMORIES

This invention relates to sense amplifier and bit driver circuits for semiconductor memory systems, and more particularly to a combined sense amplifier/bit driver circuit for detecting and generating differential signals which requires the use of a single decoder.

In semiconductor memory systems, it is conventional practice to couple all cells in a group (typically, in a column) to a pair of conductors. These conductors are extended both to a sense amplifier and to a bit driver. When the sense amplifier is enabled along with a particular one of the cells in the group, the selected cell causes a signal to appear on one of the two conductors in accordance with its state; the sense amplifier then determines the state of the cell depending upon the relative polarities of the signals. To write a bit in a selected cell, the bit driver is controlled to apply different signals to the same two conductors, the relative polarities of the signals determining whether a 1 or a 0 is written. The use of differential signals in this manner is standard practice; not only is the system noise rejection improved, but the system speed is increased as well.

In order to enable a particular one of many sense amplifiers (for reading) or a particular one of many bit drivers (for writing) it is necessary to provide a plurality of decoders. Certain bits in the address transmitted to a particular chip identify a column of cells. A decoder must be provided for each column to determine when the respective sense amplifier or bit driver should operate. A read/write signal is usually also transmitted to each chip. This signal indicates whether the identified sense amplifier or the identified bit driver should function, depending upon whether a read or write operation is to be performed. It would appear that only a single decoder would be required for each column. The decoder would identify the sense amplifier and bit driver associated with the selected column, and the read/write signal would then control which of the two circuits operates.

However, in the prior art a single decoder has been used for each column only where differential signals have not been employed for reading and writing. In the case where a single sense/drive conductor is associated with a column of cells, with the polarity of the signal on the single conductor representing one of the two possible states of the cell, it has been possible to utilize only a single decoder to enable the operation of both the sense amplifier and bit driver, with the polarity of the read/write signal when determining which of the two circuits functions. But when differential signals have been employed, it has not been possible in the prior art to utilize a single decoder. Instead, two decoders have been provided for each column, one for enabling the operation of the sense amplifier and the other for enabling the operation of the bit driver. This is due the fact that the enabling signals for the two different circuits have generally been of opposite polarities as a result of the different functions performed by the two circuits. As a result, it has been found necessary to provide a pair of decoders for each sense amplifier/bit driver pair where differential signals are employed for both reading and writing.

It is a general object of our invention to provide a single decoder for a sense amplifier/bit driver in a system utilizing differential read/write signals.

Briefly, this is accomplished in the illustrative embodiment of the invention by utilizing the signal polarity output of the decoder for enabling both the collector supply of the bit driver and the ground supply of the sense amplifier. In the absence of the operation of the decoder, neither circuit is enabled. When the decoder determines that one of the two associated circuits is to function, both are enabled for operation with the "-turning on" of the bit driver collector supply and the sense amplifier ground supply. A single read/write conductor extended to the combined circuit determines which of the two enabled circuits functions.

It is a feature of our invention to utilize the single polarity output of a decoder to enable one of the supplies of a differentially operated bit driver and the other of the supplies of a differentially operated sense amplifier, with the polarity of a read/write signal controlling which of the two circuits functions.

Further objects, features and advantages of our invention will become apparent upon consideration of the following detailed description in conjunction with the drawing, in which.

Figure 1:
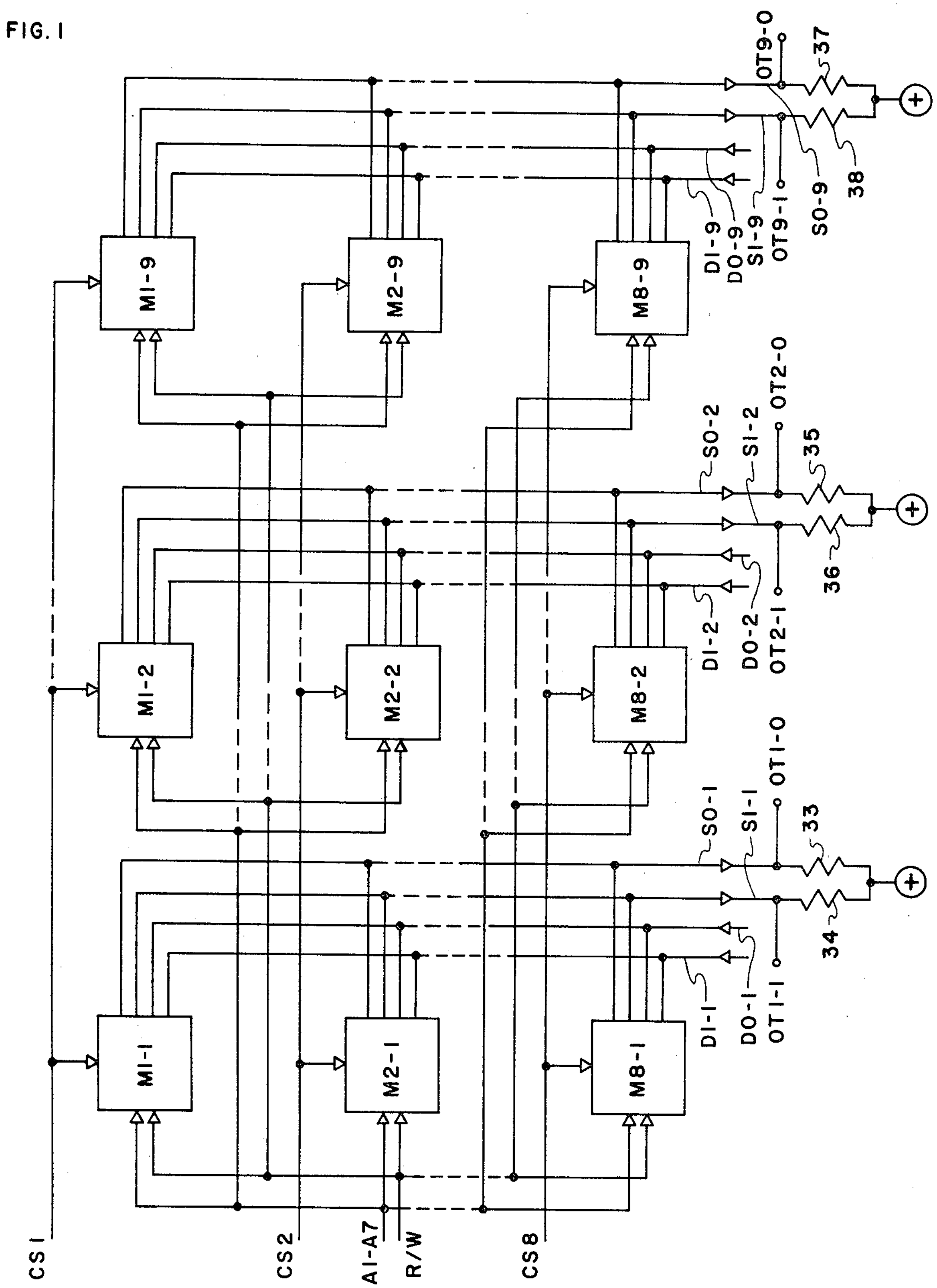
FIG. 1 depicts schematically a typical memory system in which the invention finds application.

A typical semiconductor memory system includes a plurality of modules M—1 through M8–9 as shown in FIG. 1. Each module includes a plurality of memory cells contained on a single semiconductor chip. The modules of FIG. 1 are arranged in eight rows and nine columns. Each module contains 128 cells. A single 9-bit word in any row of modules can be selected by identifying the same numbered cell in each module in the row. Since each of the eight rows of modules contains 128 9-bit words, the entire memory contains 1,024 9-bit words.

One of the 8 chip select conductors CS1–CS8 is extended to all modules in each row. A particular row of modules is selected by energizing one of the chip select conductors. (The circuits for energizing the chip select conductors, the address conductors and the read/write conductors are not shown since circuits of these type are well known to those skilled in the art and do not comprise a part of the present invention.) Once a particular row of modules is selected, it is necessary to further identify one of the 128 words contained in that row of modules. The seven address bits A1–A7 are extended over the respective conductors to all modules. The seven address bits define one of 128 words. The same numbered word is identified in each row of modules, but of course only one word is operated upon depending upon which of the eight chip select conductors is energized. Once a particular word is identified in this manner, the row of modules containing the cells in the selected word must be controlled to operate in either the read or write mode. The read/write conductor R/W is extended to every module and the state of this conductor controls the mode in which the memory system operates. Typically, all 72 modules of FIG. 1 are contained on a single card, as is known in the art.

A pair of bit driver conductors DO–, D1–is associated with each column of modules. For example, bit driver conductors DO–2, D1–2 are connected to the eight modules M1–2 through M8–2 in column 2 of the array. Depending upon the relative polarities of the signals on these conductors, a 1 or 0 is written into the single cell in the second column of modules which is selected by address bits A1–A7 and the particular one of the eight chip select conductors which is energized. Both conductors are normally low in potential. To write a 1 in the selected cell conductor D1–2 is raised in potential, and to write a 0 conductor DO–2 is raised in potential. For example, suppose it is necessary to write bits in the cells comprising word number 47 in module row number 2. In such a case, chip select conductor CS2 would be energized, the R/W line would be in the "write" state and bits A1–A7 would identify the number 47 . With conductor D1–2 going high relative to conductor D0–2, a 1 would be written in the second of the nine modules representing the selected word. The circuitry for driving the DO–, D1–conductors is not shown inasmuch as such circuitry is not necessary for an understanding of the present invention and is well known to those skilled in the art.

Similarly, a pair of SO–,S1– conductors is associated with each column of modules. When a selected word is read from the memory, the signals on each pair of SO–,S1– conductors represent a particular bit). In the same example considered above (but in this case with the read/write signal indicating a read operation rather than a write operation), the signals on conductors SO–2, S1–2 would represent the value of the second bit in word number 47 in the second row of modules. If current flows in conductor S1–2, it is an indication that the bit read is a 1, and if current flows in conductor SO–2 it is an indication that the bit read is a 0. The selected cell in the selected one of the eight modules in column 2 causes current to flow into the cell through either one of the sense conductors. The current flows from a potential source and through one of resistors 33–38 connected to the conductor as shown in FIG. 1. Thus if current flows through conductor SO–2, the potential of output terminal OT2–0 drops to indicate that the respective bit is a 0 . Similarly, if current flows through conductor S1–2, the potential at output terminal OT2–1 drops to indicate that the bit read is a 1. Circuits for detecting a drop in potential at the various output terminals are well known to those skilled in the art.

Figure 2:
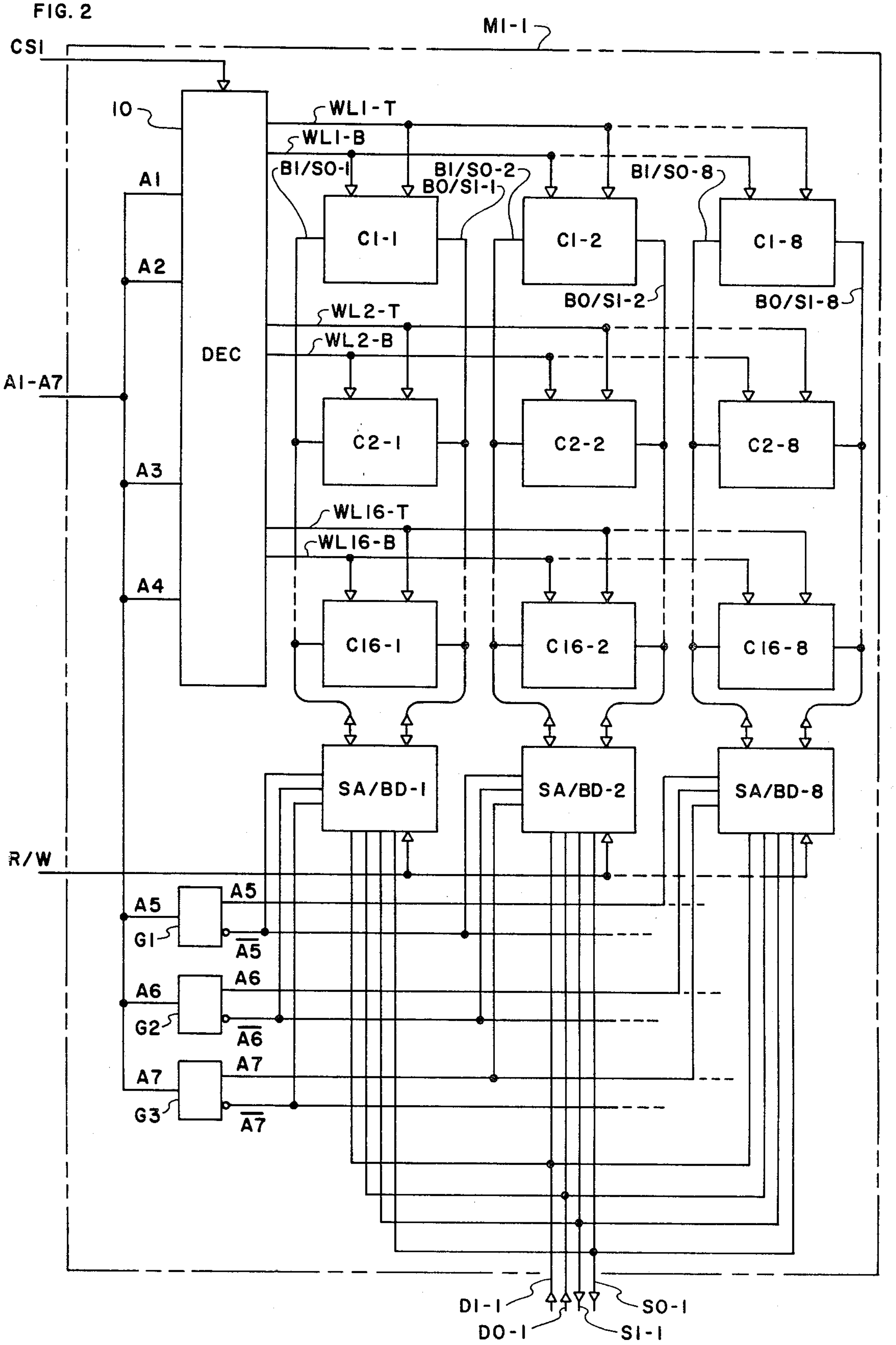
FIG. 2 depicts schematically the circuitry included in a particular one of the modules shown in block diagram form in FIG. 1.

For a complete understanding of the illustrative embodiment of the invention, it is necessary to briefly review the circuitry in a typical one of the memory modules of FIG. 1. The circuitry in module M1–1 is shown in FIG. 2. The module includes 128 memory cells c1–1 through C16–8 arranged in 16 rows and 8 columns. A pair of conductors WL1–T, WL1–B is extended from decoder 10 to the eight cells in the first row. To select a cell in the first row, the decoder raises the potential of both of these conductors (for a purpose to be described below). Similarly, a pair of conductors WL2–T, WL2–B through WL16–T, WL16–B is associated with each of the other 15 row of cells. Decoder 10 energizes a particular one of the pairs of conductors in accordance with the values of the four address bits A1–A4 extended to it over address conductors A1–A4. The operation of a drive circuit in such a decoder is disclosed in our co-pending application Ser. No. 17,567, filed on Mar. 9, 1970. Although the same address bits are extended to all modules in the array of FIG. 1, the decoders in only one particular row of modules are enabled to operate depending upon which of the eight chip select conductors is energized. Decoder 10 in FIG. 2 operates only if chip select conductor CS1 is energized.

Each column of cells is connected by a respective pair of vertical conductors to one of the eight sense amplifier/bit driver circuits SA/BD–1 through SA/BD–8. To select a particular one of the eight cells in the selected row of cells, it is necessary to enable the operation of only one of the eight sense amplifier/bit driver circuits. This is controlled by address bits A5–A7 Bit A5 is extended to the input of true and complement generator G1 which in turn provides a same value signal on output conductor A5 and an opposite polarity signal on output conductor $\overline{A5}$. Similarly, true and complement generators G2 and G3 provide bit signals A6, $\overline{A6}$, A7 and $\overline{A7}$. A respective combination of three of the six true and complement generator output conductors is extended to the decoder inputs of each of the sense amplifier/bit driver circuits. For example, to select circuit SA/BD–1, it is necessary for all of conductors $\overline{A5}$, $\overline{A6}$, $\overline{A7}$ to be high to indicate an address 000. Similarly, circuit SA/BD–2 is energized when the three address bits are respectively 0,0,1 and circuit SA/BD–8 is selected when the three address bits are 1,1,1. The selection of a particular one of the eight sense amplifier/bit driver circuits completes the identification of one of the 128 cells in module M—1. It is still necessary to cause the selected sense amplifier/bit driver to operate in either the read or the write mode. For this reason, read/write conductor R/W is extended to an input of each of the eight circuits. Depending upon the state of this conductor, the circuit functions in one of the two modes.

Referring back to FIG. 1, bit driver conductors DO–1, D1–1 are extended to all eight modules in column 1 of the array. The two conductors are shown extended to modules M1–1 in FIG. 2. Also, as shown in FIG. 2, the two conductors are extended to each of the 8 sense amplifier/bit driver circuits in the module. Similarly, conductors SO–1, S1–1 are extended to all 8 modules in column 1 of the array as shown in FIG. 1. As shown in FIG. 2, these two conductors are extended to each of circuits SA/BD–1 through SA/BD–8 in module 1. Although the write signals applied to conductors DO–1, D1–1 are extended to all eight sense amplifier/bit driver circuits in module M1–1, the only one of the eight circuits which operates on the write signals is that one whose three address inputs are all high. Similarly, the output signals appearing on conductors SO–1, S1–1 are derived from only the one enabled sense amplifier/bit driver circuit.

Conductor pair B1/So–1, Bo/S1–1 couples each of the 16 cells in column 1 of module M1–1 to sense amplifier/bit driver SA/BD–1. Similarly, a pair of similar conductors couples each of the other seven columns of cells to a respective one of the seven circuits SA/BD–2 through SA/BD–8 . To write a 1 into cell C2–1, for example, conductor R/W is raised in potential, and conductor D1–1 is raised in potential relative to conductor DO–1. At the same time, the decoder at the input of sense amplifier/bit driver SA/BD–1 operates (as will be described below) to enable the operation of this circuit to the exclusion of the other seven similar circuits. The circuit is caused to operate in the write mode with the application of a high potential to conductor R/W. Circuit SA/BD–1 then causes conductor B1/S0–1 to go high to the exclusion of conductor B0/S1–1. Cell C2–1 is selected when decoder 10 causes both of conductors WL2–J, WL2–B to go higher in potential than the other 15 pairs of decoder output conductors. The high potential on conductor B1/S0–1 sets cell C2–1 in the 1 state. Similarly, to write a 0 in the same cell, conductor D0–1 is raised in potential relative to conductor D1–1.

To read the bit stored in the same cell C2–1, conductor R/W is made low in potential. In this case, current flows from cell C2–1 through either conductor B1/So–1 or conductor B0/S1–1 to sense amplifier/bit driver SA/BD–1. If the bit stored in the cell is a 1, current flows through conductor B0/S1–1. Depending upon the state of the cell, one of conductors S0–1, S1–1 goes low.

Figure 3:
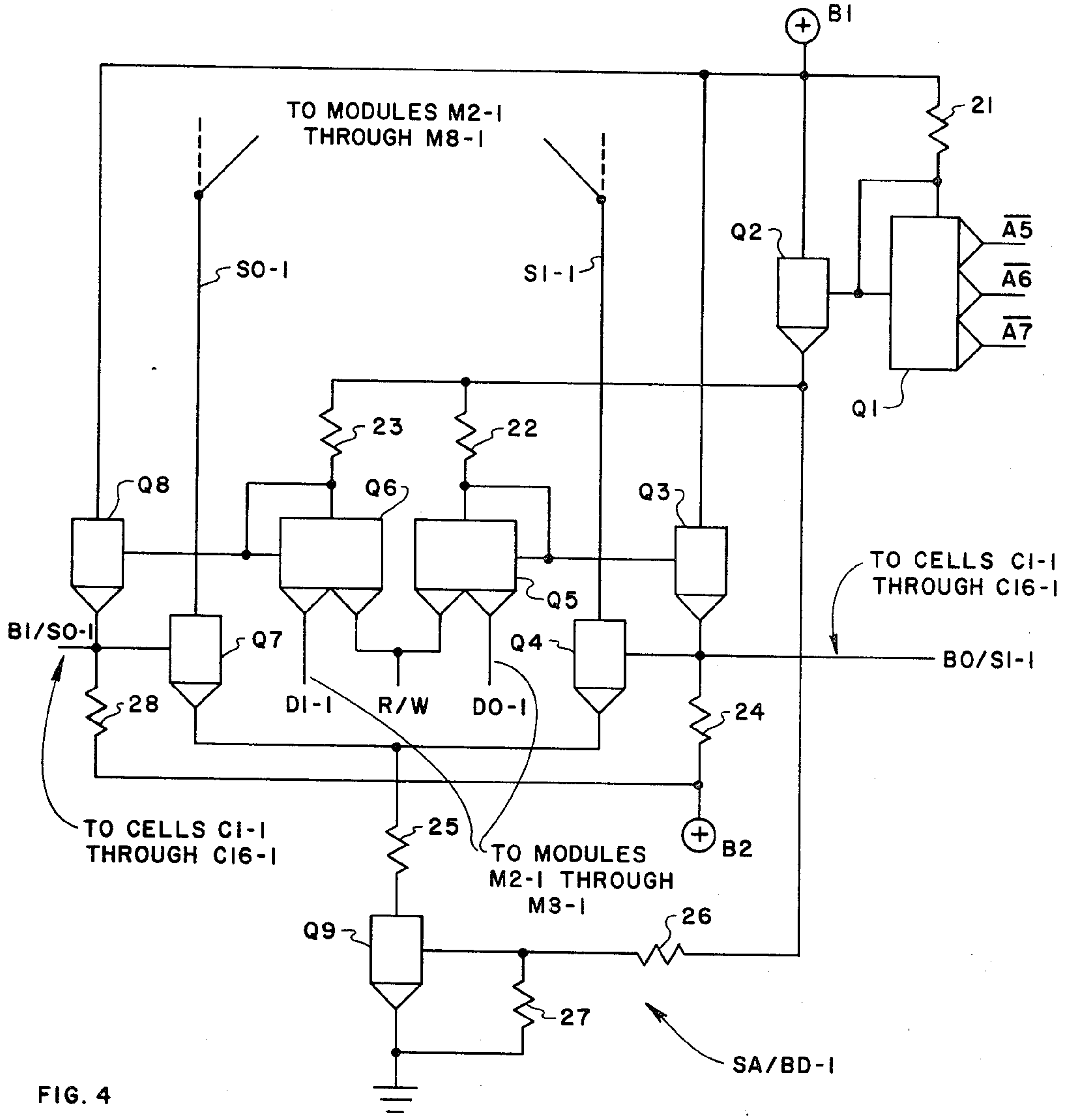
FIG. 3 depicts an illustrative embodiment of our invention; that is, the circuitry included in sense amplifier/bit driver SA/BD–1 in FIG. 2.
Figure 4:
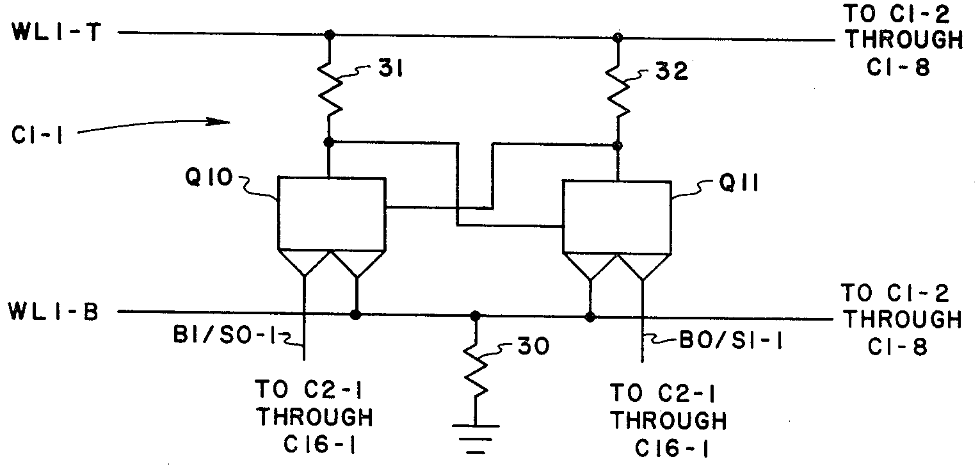
FIG. 4 depicts the cell circuitry included in block C1–1 of FIG. 2.

Before proceeding with a description of the sense amplifier/bit driver shown in FIG. 3, it is necessary to understand the operation of a typical cell inasmuch as the sense amplifier/bit driver must generate the signals to write a bit in a selected cell or must sense the signals representative of the bit stored in the selected cell. Cell C1–1 is shown in FIG. 4. Double-emitter transistors Q10, Q11 are cross-coupled in a conventional manner. The collectors of both transistors are extended through respective resistors 31, 32 to decoder output conductor WL1–T, and the two inner emitters are connected through resistor 30 to ground as well as to decoder output conductor WL1–B. The two outer emitters are connected to respective conductors B1/S0–1 and B0/S1–1. The potential of both of these conductors (potential B2 to be described below with reference to FIG. 3) is normally greater than that of conductor WL1–B. If the cell is in the 1 state, for example, transistor Q11 conducts current. Since the inner emitter is at a potential less than that of the outer emitter, the current flows through resistor 32, the transistor and the inner emitter, and resistor 30 to ground. No current flows through conductor B0/S1–1. The low collector voltage of transistor Q11, cross-coupled to the base of transistor Q10, prevents conduction of transistor Q10.

To sense the state of the cell, the potentials of both of conductors WL1–T and WL1–B are raised. The potential of conductor WL1–B is raised above those of conductors B1/S0–1 and B0/S1–1. (The potential of conductor WL1–T is raised as well in order that the conducting transistor remain conducting when its emitter potential is raised and also to increase the current flow for reading purposes.) With conductor WL1–B raised in potential, current can no longer flow through the inner emitter of transistor Q11. The current which previously flowed through the transistor is switched to the outer emitter and flows through conductor B0/S1–1 to indicate the storage of a 1 bit in the cell. No current flows through conductor B1/S0-1 since transistor Q10 is off.

Similarly, if a 0 is stored in the cell, transistor Q10 conducts rather than transistor Q11. When the potential of conductor WL1–B is raised, the current which previously flowed through the inner emitter of transistor Q10 is switched to the outer emitter and the current flow through conductor B1/S0–1 indicates the storage of a 0 in the cell.

To write a bit value in the cell, the potentials of both conductors WL1–T, WL1–B are raised in a similar manner. However, this time the sense amplifier/bit driver causes the potential of one of conductors B1/SO–1 and B0/S1–1 to go high. For example, suppose the potential of conductor B1/S0–1 is raised. In this case, transistor Q10 cannot conduct current through its inner emitter because conductor WL1–B to which it is connected is at a raised potential, nor can it conduct current through its outer emitter which is connected to conductor B1/S0–1 whose potential is high, As for transistor Q11, while its inner emitter is high, its outer emitter is still low. Current than flows through resistor 32 and transistor Q11 and the low voltage at the base of transistor Q10 keeps this transistor off. With transistor Q11 conducting, a 1 is stored in the cell. Similarly, to store a 0 in the cell, the potential of conductor B0/S1–1 is raised. At the end of the write operation, conductors WL1–T and WL1–B go low in potential. The current flow through the conducting transistor is switched from the outer emitter to the inner emitter. This type of cell is disclosed in L. R. Harper U.S. Pat. No. 3,423,737.

It should be noted that the various conductors in FIG. 4 are shown as extending to the other cells in the respective row and column. Referring back to FIG. 2, it will be seen that conductors WL1–T and WL1–B are extended to all of cells C1–1 through C1–8. For this reason, conductors WL1–T and WL1–B in FIG. 4 are shown as being extended to cells C1–2 through C1–8. Similarly, since conductors B1/S0–1 and B0/S1–1 are connected to all 16 cells in the first column of cells in module M1–1 , these two conductors are shown as being extended to cells C2–1 through C16–1 (from which they are extended to sense amplifier/bit driver SA/BD–1).

Sense amplifier/bit driver SA/BD–1 is shown in FIG. 3. The three respective address conductors $\overline{A5}$, $\overline{A6}$, $\overline{A7}$ are connected to the three emitters of transistor Q1. Conductors B0/S1–1 and B1/S0–1 are shown extended to all 16 cells C1–1 through C16–1 in column 1 of module M1–1. Driver conductors D0–1 and D1–1 are shown extended to the other 7 modules M2–1 through M8–1 in the first column of modules of the overall array. As is apparent from an inspection of FIG. 1, conductors D0–1 and D1–1 interconnect all eight modules and are then extended to the driving circuits, not shown. Similar remarks apply to sense conductors S0–1 and S1–1.

As long as at least one of conductors $\overline{A5}$, $\overline{A6}$, $\overline{A7}$ is low in potential, transistor Q1 conducts, current flowing from source B1 through resistor 21 and a base-emitter junction of the transistor. The potential of the collector of the transistor, coupled to the base of transistor Q2, is low and transistor Q2 remains off. The potential of source B1 is not extended to collector resistors 22 and 23, nor is it extended through resistor 26 to the base of transistor Q9. Since there is no collector supply for transistors Q5 and Q6, these transistors remain off. Similarly, since the base of transistor Q9 is extended through resistor 27 to ground, this transistor remains off as well.

With transistor Q5 off, the base of transistor Q3 is connected to ground through resistors 22, 26 and 27. Transistor Q3 thus remains off. The emitter of the transistor, extended through resistor 24 to potential source B2, is at the potential of this source, as is conductor B0/S1–1. As described above in connection with the cell of FIG. 4, when this conductor is high — when no operations are being performed on the cells in column 1 of module M1–1 —current does not flow through the outer emitter of transistor Q11 since the inner emitter of the transistor is connected to conductor WL1–B which is at a lower potential. Similarly, transistor Q8 remains non-conducting since its base terminal is extended through resistors 23, 26 and 27 to ground. The emitter of the transistor is extended through resistor 28 to source B2. Consequently, conductor B1/S0–1 is similarly held at the potential of source B2 and no current flows through the outer emitter of transistor Q10 in FIG. 4 (and the outer emitters of all similar transistors in cells C2–1 through C16–1).

The potential of source B2 appear at the base of each transistors Q4 and Q7. However, the emitters of these two transistors are connected together through resistor 25 to the collector of transistor Q9. since this transistor is held off, there is no current flow in sense conductors S0–1 and S1–1.

To select sense amplifier/bit driver SA/BD–1 for operation, all of address conductors A5, A6, A7 are made to go high in potential. The base-emitter junctions of transistor Q1 are reverse-biased and potential source B1 is connected through resistor 21 to the base of transistor Q2. This transistor turns on and the potential of source B1 minus the base emitter drop of transistor Q2 is extended both to collector resistors 22, 23 and through resistor 26 to the base of transistor Q9. Consequently, all three of transistors Q5, Q6 and Q9 are enabled for operation. Which of the transistors operates depends upon the state of read/write conductor R/W and bit driver conductors DO–1 and D1–1.

In order to write a bit in a selected cell, the potential of conductor R/W is made to go high. Consequently, no current can flow through the inner emitters of transistors Q5 and Q6. However, current can flow through the outer emitter of one of the two transistors depending upon which of conductors D1–1 and D0–1 is left low. Normally, the potential of both of these conductors is low. However, to write a 0 in a selected cell, conductors D0–1 is made to go high in potential, and to write a 1 in a selected cell conductor D1–1 is made to go high in potential. For example, suppose it is necessary to write a 1 in the selected cell. With conductor D1–1 high in potential, transistor Q6 still remains off even though transistor Q2 now extends a collector potential through resistor 23 to transistor Q6 since both of its emitters are high in potential.

With the transistor off, the high potential which is now at the collector of transistor Q6 is extended to the base of transistor Q8 and this transistor turns on. There is a very small drop across the transistor (in the order of 0.8 volts), and consequently the emitter of the transistor is raised to a potential slightly less that that of source B1. The high potential on conductor B1/SO–1 prevents transistor Q11 (FIG. 4) from turning on by current flowing through its outer emitter. With conductor D0–1 still low in potential however, transistor Q5 does conduct current through its outer emitter. Since there is a substantial voltage drop across resistor 22, the full potential of source B1 is not extended to the base of transistor Q3. Transistor Q3 remains off and conductor B0/S1–1 remains at the lower potential of source B2. Referring back to FIG. 4, it will be recalled that with conductor B0/S1–1 at the lower potential of source B2, when conductors WL1–T and WL1–B are raised in potential transistor Q11 conducts current through its outer emitter. Consequently, transistor Q11 turns on and a 1 is stored in cell C1–1.

Similarly, to write a 0 in this cell, conductor D0–1 is made to go high rather than conductor D1–1. In this case, transistor Q5 remains off and transistor Q3 conducts. The high potential of source B1 (less the drop across transistor Q3) on conductor B0/S1–1 prevents conduction in transistor Q11, while the lower potential of source B2 which still appear on conductor B1/S0–1 allows transistor Q10 to turn on.

During a write operation, transistor Q9 conducts and transistors Q4 and Q7 are provided with an emitter current path. However, the appearance of a data out signal on one of conductors S0–1 or S1–1 during a write operation is not pertinent to the system operation.

To read a bit in a selected cell such as C1–1, conductor R/W is made low in potential. In such a case, the inner emitters of transistors Q5, Q6 are at a low potential and both transistors conduct. Consequently, the collectors of both transistors are at a relatively low potential and since the collector terminals are coupled to the base terminals of transistors Q3 and Q8, both of these transistors remain off. With no current flowing through these transistors, potential source B2 is extended through resistors 24 and 28 to both of conductors BO/S1–1. With both of these conductors held at the potential of source B2, it will be recalled that when conductors WL1–T and WL1–B in FIG. 4 are raised in potential, current flows from the turned on one of transistors Q10 or Q11 through the respective outer emitter. For example, suppose that cell C1–1 is in the 1 state with transistor Q11 conducting. When conductor WL1–B is raised in potential, the current through transistor Q11 switches from the inner emitter to the outer emitter and current flows through conductor B0/S1–1. This current raises the potential in conductor BO/S1–1 and transistor Q4 turns on. Consequently, current flows through conductor S1–1 into the collector of transistor Q4 and output terminal OT1–1 (see FIG. 1) goes low in potential to indicate the storage of a 1 in the selected cell being read. Transistor Q7 conducts much less current inasmuch as transistor Q10 in FIG. 4 is off and no current flows through conductor B1/S0–1. On the other hand, in the case of a 0 being stored in cell C1–1, transistor Q7 conducts rather than transistor Q4 and current flows through conductor S0–1 with output terminal OT1–0 going lower than output terminal OT1–1.

It is thus apparent that with the sense amplifier/bit driver of FIG. 3, a single decoder (transistor Q1) enables both the sense amplifier function and the bit driver function, despite the fact that differential signals control both reading and writing.

Although the invention has been described with reference to a particular embodiment, it is to be understood that this embodiment is merely illustrative of the application of the principles of the application. Numerous modifications may be made therein and other arrangements may be devised without departing from the spirit and scope of the invention.

What we claim is:

1. A sense amplifier/bit driver circuit for operating with a plurality of semiconductor memory cells coupled to a common pair of sense/drive conductors, each of said cells being operative to cause a current to flow through one of said sense/drive conductors depending upon its memory state when it is selected for reading and each of said cells having a bit value stored therein depending upon the relative polarities of the potentials appearing on said sense/drive conductors when the cell is selected for writing, the sense amplifier/bit driver circuit comprising a first source of potential, a second source of potential, decoding means, a pair of transistor write-controlling menas normally held non-conducting by said decoding means, said second source of potential being operative to energize both of said sense/drive conductors in the absence of the conduction of said pair of transistor write-controlling means, means controlled by said decoding means for enabling the conduction of said pair of transistor write-controlling means, read/write means for inhibiting the conduction of said pair of transistor write-controlling means when a bit is to be read from one of said cells and for enabling the conduction of both of said transistor write-controlling means when a bit is to be written in one of said cells and said decoding means is operated, means for causing only one of said transistor write-controlling means to conduct even when said decoding means is operated and said read/write means does not prevent the conduction thereof to control the potential of said first source to energize one of said sense/drive conductors for governing the writing of a respective bit in one of said cells, a pair of output transistor means each connected to a respective one of said sense/drive conductors, means normally for disabling the operation of said pair of output transistor means, and means responsive to the operation of said decoding means for enabling the operation of both of said output transistor means, only one of said output transistor means being operated depending upon the difference voltage appearing across said pair of sense/drive conductors.

2. A sense amplifier/bit driver circuit in accordance with claim 1 wherein each of said transistor write-controlling means includes a transistor terminal connected to a respective one of said sense/drive conductors and each of said output transistor means includes a transistor terminal connected to a respective one of said sense/drive conductors.

3. A sense amplifier/bit driver circuit in accordance with claim 2 wherein said disabling means includes output control transistor means connected to a transistor terminal of each of said output transistor means and normally being held non-conducting to disable the operation of said output transistor means, said decoding means being operative to cause simultaneous conduction in said output control transistor means and one of said transistor write-controlling means.

4. A sense amplifier/bit driver circuit in accordance with claim 3 wherein said transistor write-controlling means and said output control transistor means are all enabled by the same polarity signal generated by said decoding means.

5. A sense amplifier/bit driver circuit for operating with a plurality of semiconductor memory cells coupled to a common pair of sense/drive conductors, each of said cells being operative to cause a current to flow through one of said sense/drive conductors depending upon its memory state when it is selected for reading and each of said cells having a bit value stored therein depending upon the relative polarities of the potentials appearing on said sense/drive conductors when the cell is selected for writing, the sense amplifier/bit driver circuit comprising a first source of potential, a second source of potential, decoding means, write-controlling means normally held unoperated by said decoding means, said second source of potential being operative to energize both of said sense/drive conductors in the absence of the operation of said write-controlling means, means controlled by said decoding means for enabling the operation of said write-controlling means, read/write means for inhibiting the operation of said write-controlling means when a bit is to be read from one of said cells and for enabling the operation of said write-controlling means when a bit is to be written in one of said cells and said decoding means is operated, means for causing said write-controlling means when operated to cause the potential of said first source to energize a selected one of said sense/drive conductors to control the writing of a respective bit in one of said cells, a pair of output transistor means each connected to a respective one of said sense/drive conductors, means normally for disabling the operation of said pair of output transistor means, and means responsive to the operation of said decoding means for enabling the operation of both of said output transistor means, only one of said output transistor means being operated depending upon the difference voltage appearing across said pair of sense/drive conductors.

6. A sense amplifier/bit driver circuit in accordance with claim 5 wherein each of said write-controlling means includes a transistor terminal connected to a respective one of said sense/drive conductors and each of said output transistor means includes a transistor terminal connected to a respective one of said sense/drive conductors.

7. A sense amplifier/bit driver circuit in accordance with claim 6 wherein said disabling means includes output control transistor means connected to a transistor terminal of each of said output transistor means and normally being held non-conducting to disable the operation of said output transistor means, said decoding means being operative to cause said output control transistor means to conduct and said write-controlling means to operate simultaneously.

8. A sense amplifier/bit driver circuit in accordance with claim 7 wherein said write-controlling means and said output-control transistor means are enabled by the same polarity signal generated by said decoding means.

9. A sense amplifier/bit driver unit in accordance with claim 5 wherein said decoding means has a single polarity output signal when operated, said single polarity output signal enabling both said write-controlling means and said output transistor means.

10. A sense amplifier/bit driver circuit for operating with a plurality of semiconductor memory cells coupled to a common pair of sense/drive conductors, each of said cells being operative to apply differential signals on said sense/drive conductors depending upon its memory state when it is selected for reading and each of said cells having a bit value stored therein depending upon the differential signals applied to said sense/drive conductors by the same amplifier/bit driver circuit when the cell is selected for writing, the sense amplifier/bit driver circuit comprising means for determining whether a read or a write operation is to be performed on a selected cell, decoding means for generating a single polarity output signal, means responsive to the generation of said single polarity output signal when a write operation is to be performed for applying differential signals to said sense/drive conductors, and means coupled to said sense/drive conductors for sensing differential signals thereon applied by one of said cells responsive to the generation of said single polarity output signal when a read operation is to be performed.

11. A sense amplifier/bit driver circuit in accordance with claim 10 wherein said differential signal applying means includes a pair of write transistors each having an emitter terminal coupled to one of said sense/drive conductors and means for applying differential signals to the base terminals of said write transistors, and said sensing means includes a pair of sense transistors each having a base terminal coupled to one of said sense/drive conductors, and further including means responsive to the generation of said single polarity output signal for applying a common drive signal to the emitter terminals of said sense transistors.

12. A sense amplifier/bit driver circuit in accordance with claim 11 wherein said common signal applying means includes a transistor having a collector terminal coupled to the emitter terminals of said sense transistors and a base-emitter circuit, and means for forward biasing said base-emitter circuit responsive to the generation of said single polarity output signal.

13. A sense amplifier/bit driver circuit in accordance with claim 12 wherein said base terminal differential signal applying means includes means normally for applying reverse-biasing potentials to said write transistor base terminals, and means responsive to the generation of said single polarity output signal when a write operation is to be performed for applying a forward-biasing potential to one of said write transistor base terminals in accordance with the value of the bit to be written in the selected memory cell.

* * * * *